US008882054B1

(12) United States Patent
Maki et al.

(10) Patent No.: US 8,882,054 B1
(45) Date of Patent: Nov. 11, 2014

(54) PIPE RACK

(71) Applicants: Aaron Richard Maki, Gillette, WY (US); Brian Glenn Gilbert, Gillette, WY (US)

(72) Inventors: Aaron Richard Maki, Gillette, WY (US); Brian Glenn Gilbert, Gillette, WY (US)

(*) Notice: Subject to any disclaimer, the term of this patent is extended or adjusted under 35 U.S.C. 154(b) by 2 days.

(21) Appl. No.: 13/742,938

(22) Filed: Jan. 16, 2013

(51) Int. Cl.
*F16L 3/00* (2006.01)
*E21B 19/14* (2006.01)
*F16L 3/22* (2006.01)

(52) U.S. Cl.
CPC ... *F16L 3/00* (2013.01); *F16L 3/22* (2013.01); *E21B 19/14* (2013.01)
USPC .......................................... 248/68.1; 211/70.4

(58) Field of Classification Search
CPC ....... A47F 7/0021; A47F 7/0035; A47F 7/28; A47F 7/281; A47F 7/007; A47F 7/0014; B25H 3/04; B25H 7/005; B65D 71/70; B65D 85/20; A47B 81/005; E21B 19/14; E21B 19/15; E21B 19/20; B65G 1/0442; F16L 3/22; F16L 3/221; F16L 3/222; F16L 3/223; F16L 3/2235; F16L 3/227; F16L 3/23; F16L 3/233; F16L 3/237; F16L 3/26; F16L 3/00
USPC ...................... 211/60.1, 59.4, 70.4, 194, 49.1, 211/41.14–41.16, 182, 191, 151; 248/49, 248/65, 67.5, 68.1, 70, 73, 74.5; 206/443; 269/17; 29/281.1, 525.14
See application file for complete search history.

(56) References Cited

U.S. PATENT DOCUMENTS

| 1,393,054 | A | * | 10/1921 | Turner | 211/60.1 |
|---|---|---|---|---|---|
| 2,291,055 | A | * | 7/1942 | Ortloff | 182/113 |
| 2,328,925 | A | * | 9/1943 | Scott | 182/114 |
| 2,618,905 | A | * | 11/1952 | Dicks et al. | 269/297 |
| 2,992,802 | A | * | 7/1961 | Spillios | 211/182 |
| 3,338,422 | A | * | 8/1967 | Hickok | 211/70.5 |
| 3,400,828 | A | * | 9/1968 | May | 211/70.4 |
| 3,701,435 | A | * | 10/1972 | Woolslayer et al. | 211/60.1 |
| 3,810,553 | A | * | 5/1974 | Crocker et al. | 414/22.61 |
| 3,945,497 | A | * | 3/1976 | Greenberg | 211/70.4 |
| 4,051,956 | A | * | 10/1977 | Teague | 414/746.4 |
| RE29,539 | E | * | 2/1978 | Willke et al. | 254/89 R |
| 4,429,861 | A | * | 2/1984 | Range | 269/40 |
| 4,453,872 | A | * | 6/1984 | Frias et al. | 414/22.61 |
| 4,474,520 | A | * | 10/1984 | Buckner et al. | 414/22.61 |
| 4,494,349 | A | * | 1/1985 | Clements | 52/633 |
| 4,533,055 | A | * | 8/1985 | Haney | 211/70.4 |
| 4,580,843 | A | * | 4/1986 | Lund | 298/18 |
| 4,706,822 | A | * | 11/1987 | Remp et al. | 211/59.4 |
| 5,743,413 | A | * | 4/1998 | Noll | 211/60.1 |
| 5,893,468 | A | * | 4/1999 | Holmes | 211/60.1 |

(Continued)

*Primary Examiner* — Jennifer E Novosad
(74) *Attorney, Agent, or Firm* — Plager Schack LLP

(57) ABSTRACT

An improved pipe rack assembly allows a user to support up to 500,000 pounds of pipes in a safe and readily removable manner. The improved pipe rack assembly comprises at least two pipe racks. Each pipe rack comprises a base assembly immediately adjacent to a removable chocking member through a removable chocking member cavity in the base assembly. The base assembly comprises a first base rail mechanically coupled to a second base rail by a horizontal base pipe; the first base rail and the second base rail are mechanically coupled to a top rail pipe by a base pipe. The top rail pipe has a greater diameter than the first base rail and the second base rail which enables the improved pipe rack assembly to support up to 500,000 pounds of pipes in the safe and readily removable manner.

3 Claims, 3 Drawing Sheets

(56) References Cited

U.S. PATENT DOCUMENTS

| | | | |
|---|---|---|---|
| 6,109,600 A * | 8/2000 | Yost et al. .................. 269/17 |
| 6,182,837 B1 * | 2/2001 | Crabtree .................... 211/59.4 |
| 6,247,601 B1 * | 6/2001 | Norton et al. ............. 211/41.14 |
| 6,450,330 B1 * | 9/2002 | Cannata ..................... 206/303 |
| 6,471,075 B2 * | 10/2002 | Robichaux ................. 211/70.4 |
| 7,143,901 B1 * | 12/2006 | Groves ....................... 211/41.14 |
| 7,264,126 B1 * | 9/2007 | Bergeron .................. 211/41.14 |
| 7,850,016 B2 * | 12/2010 | Trisler ........................ 211/70.4 |
| 7,942,371 B1 * | 5/2011 | McCoy ....................... 248/68.1 |
| 8,033,779 B2 * | 10/2011 | Gerber et al. ............. 414/745.9 |
| 8,469,085 B2 * | 6/2013 | Orgeron ..................... 166/77.51 |
| 8,528,754 B2 * | 9/2013 | Noniewicz et al. ......... 211/195 |
| 2003/0089829 A1 * | 5/2003 | Brandzel et al. ............ 248/68.1 |
| 2006/0091096 A1 * | 5/2006 | Velez et al. .................. 211/194 |
| 2006/0213847 A1 * | 9/2006 | Trisler ........................ 211/70.4 |
| 2007/0272633 A1 * | 11/2007 | Gardner et al. ............ 211/41.15 |
| 2008/0053928 A1 * | 3/2008 | Klauer ........................ 211/49.1 |
| 2013/0195583 A1 * | 8/2013 | Rodgers ..................... 414/22.62 |

* cited by examiner

PIPE RACK

FIELD OF THE INVENTION

This invention relates to devices that can be used to store pipes.

BACKGROUND OF THE INVENTION

Prior to the disclosed invention there was no way to safely chock rows of pipes. Rather, the prior art accomplished this by placing wedges on the ends of rows of pipes to prevent the pipes from rolling off of the pipe rack. The prior art includes U.S. Pat. No. 6,471,075 issued to Robichaux; U.S. Pat. No. 3,945,497 issued to Greenberg; and U.S. Pat. No. 3,701,435 issued to Woolslayer.

Robinchaux teaches an adjustable pipe rack that holds pipes between two vertical dividers the vertical dividers are attached to a bottom rail and at least one vertical divider can be moved. Robinchaux does not teach a top rail at all and does not teach pockets holding vertical dividers. Greenberg teaches a pipe rack that holds pipes between vertical dividers and horizontal dividers which can be modified by adding additional dividers with pegs. Greenberg does not teach upright supports that reduce friction make lessen work necessary to remove pipes. Woolslayer teaches a carriage for moving pipes on rails with wheels. Woolslayer teaches away from the present design which uses a grid and upper supports.

BRIEF SUMMARY OF THE INVENTION

An improved pipe rack assembly allows a user to support up to 500,000 pounds of pipes in a safe and readily removable manner. The improved pipe rack assembly comprises at least two pipe racks. Each pipe rack comprises a base assembly immediately adjacent to a removable chocking member through a removable chocking member cavity in the base assembly. The base assembly comprises a first base rail mechanically coupled to a second base rail by a horizontal base pipe; the first base rail and the second base rail are mechanically coupled to a top rail pipe by a base pipe. The top rail pipe has a greater diameter than the first base rail and the second base rail which enables the improved pipe rack assembly to support up to 500,000 pounds of pipes in the safe and readily removable manner.

BRIEF DESCRIPTION OF THE SEVERAL VIEWS OF THE DRAWINGS

Figure 1:
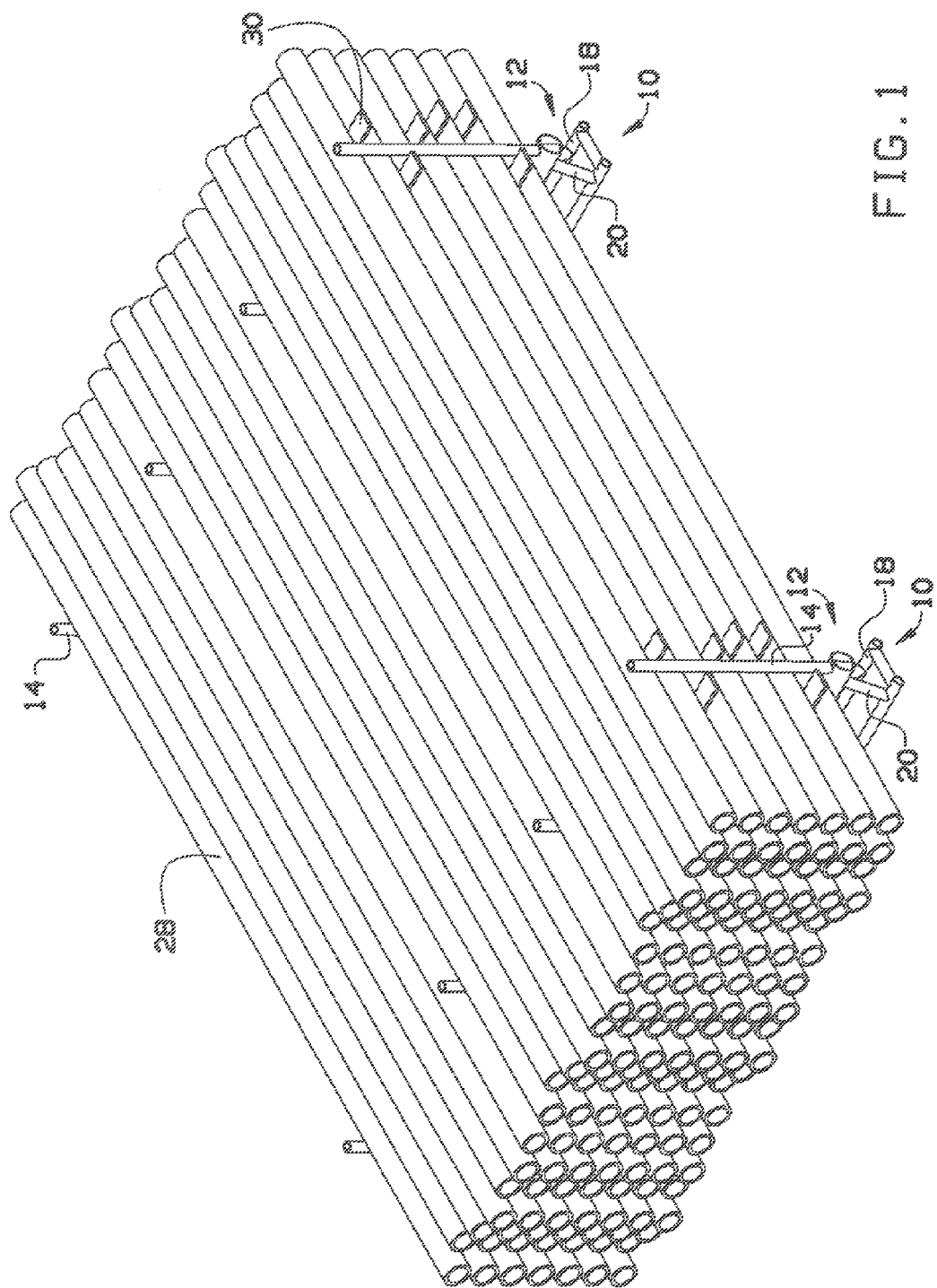
Figure 2:
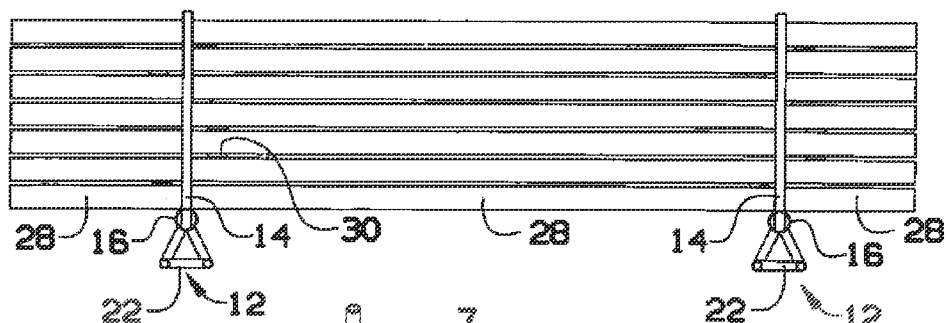
Figure 3:
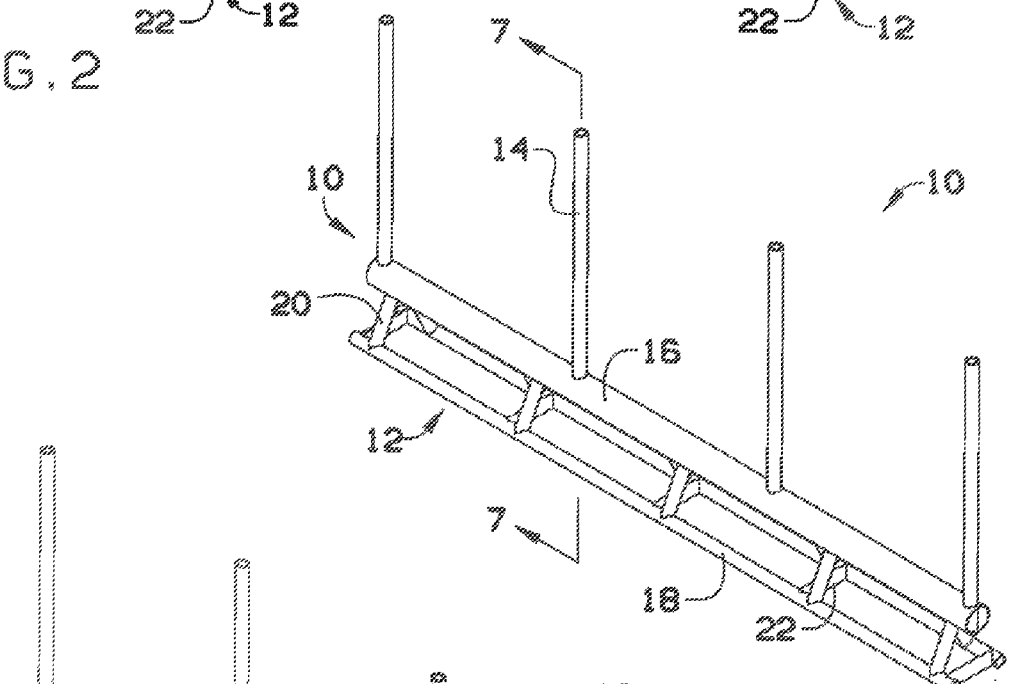
Figure 4:
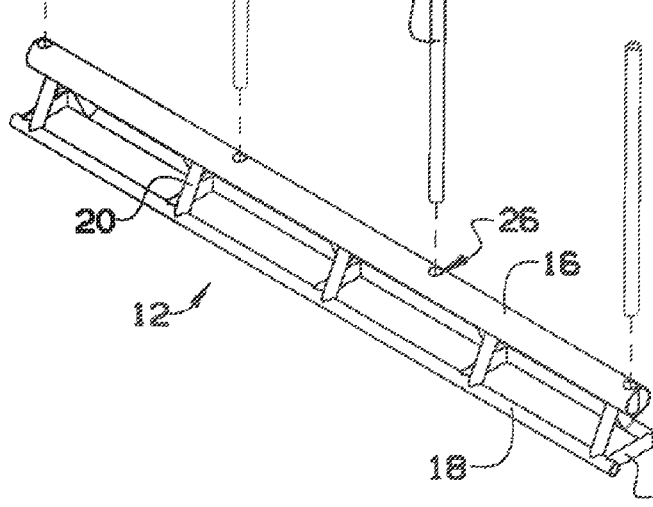
Figure 5:
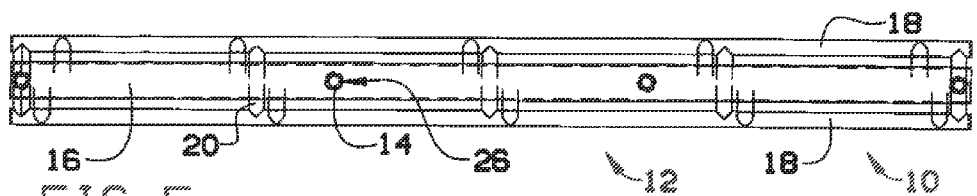
Figure 6:
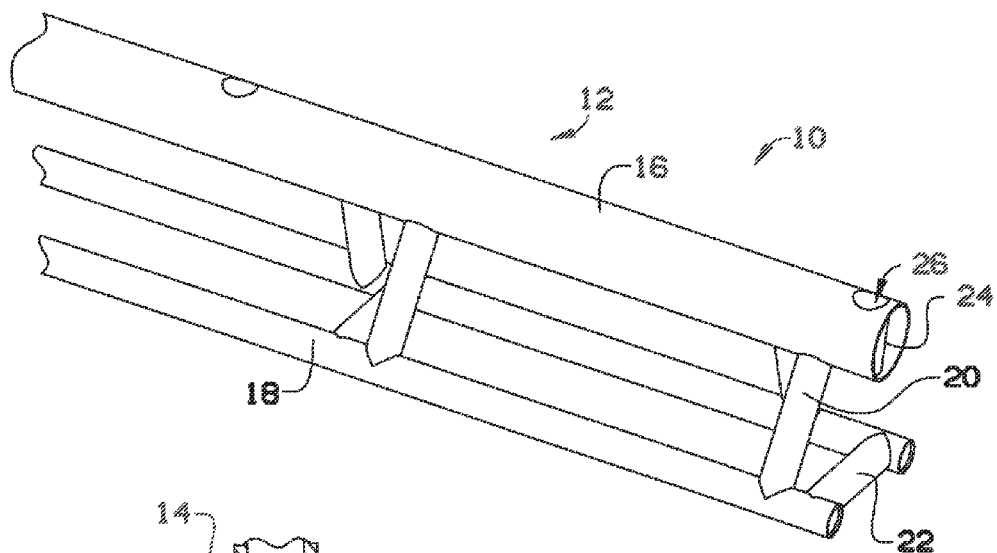
Figure 7:
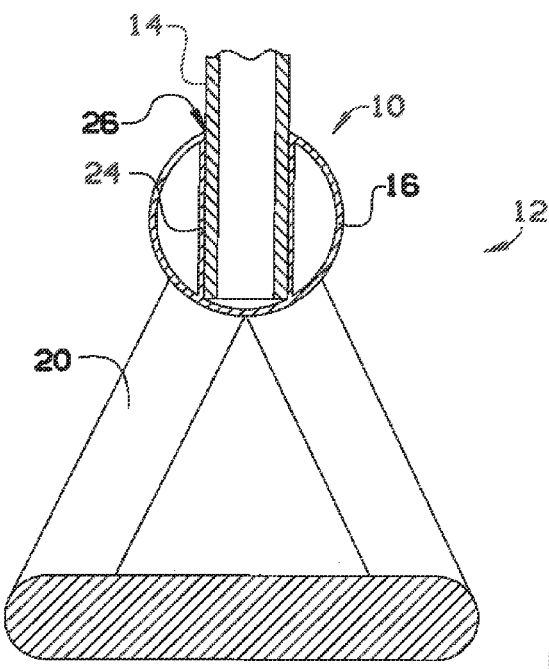

Having thus described the invention in general terms, reference will now be made to the accompanying drawings, which are not necessarily drawn to scale, and wherein:

FIG. 1 is a perspective view of the invention shown in use.
FIG. 2 is a side view of the invention shown in use.
FIG. 3 is a perspective view of the invention.
FIG. 4 is an exploded view of the invention.
FIG. 5 is a top view of the invention.
FIG. 6 is a perspective view of the invention.
FIG. 7 is a section detail view of the invention along line 7-7 in FIG. 3.

DETAILED DESCRIPTION OF THE INVENTION

Embodiments of the present invention overcome many of the obstacles associated with stacking pipes, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 and FIG. 2 show the invention in use. A user desires to hold a large number of extremely heavy pipes 28 in a safe assembly. An improved pipe rack assembly accomplishes this. The improved pipe rack assembly comprises at least two pipe racks 10. Each pipe rack 10 comprises base assembly 12 immediately adjacent to removable chocking member 14.

Base assembly 12 comprises first base rail 18 mechanically coupled to second base rail 18 by horizontal base pipe 22. First base rail 18 and second base rail 18 are mechanically coupled to top rail pipe 16 by base pipe 20. Rows of pipes 28 are separated by pipe separator 30, which can be a board and is not mechanically coupled to removable chocking member 14. In this manner, the present invention teaches away from Greenburg that utilizes rigid horizontal pipe separators. Greenburg and Woolslayer were more commonly used in an era when cranes moved pipes and offloading a series of pipes vertically was common. Present technology uses a fork lift can do this in a more efficient manner, accordingly, pipe separator 30 should be sufficiently thick to enable the forks of a forklift to fit in between rows of pipe 28.

FIG. 3 and FIG. 4 demonstrate how to assemble pipe rack 10. Top rail pipe 16 is perforated with removable chocking member cavity 26. Removable chocking member cavity 26 can accommodate but is not mechanically coupled to removable chocking member 14. In the preferred embodiment, first base rail 18, second base rail 18, horizontal base pipe 22 and base pipe 20 are 5½ inch pipe. First base rail 18, second base rail 18, horizontal base pipe 22 and base pipe 20 are cut and welded together such that they can be capped and air tested. If these pipes can hold 120 pounds per square inch of air pressure, without any air leaks, then these pipes are of adequate strength and construction for the pipe rack to hold 500,000 pounds of pipe.

The present invention teaches away from Robichaux, Greenberg, and Woolslayer which use all pipes of homogenous size, perhaps to reduce cost. Rather the present invention teaches that top rail pipe 16 should be 10¾ inches or 12 inches, but about twice as large as first base rail 18, second base rail 18, horizontal base pipe 22 and base pipe 20. This is so removable chocking member 14 can fit into top rail pipe 16 without having the diameter of removable chocking member cavity 26 cause structural instability for the pipe rack. Top rail pipe 16 has a greater diameter than first base rail 18 and second base rail 18 which enables the improved pipe rack assembly to support up to 500,000 pounds of pipes in a safe and readily removable manner. FIG. 5, FIG. 6, and FIG. 7 show the improved pipe rack in more detail. Removable chocking member cavity 26 is mechanically coupled to socket pipe 24. Socket pipe 24 has sufficient diameter to safely and securely hold removable chocking member 14 in place.

What is claimed is:

1. An improved pipe rack assembly, configured to support up to 500,000 pounds of pipes; the improved pipe rack assembly comprising:
   at least two pipe racks; each pipe rack comprises a base assembly that is adjacent to a removable chocking member through a removable chocking member cavity in the base assembly;
   the base assembly comprises a first base rail mechanically coupled to a second base rail by a horizontal base pipe;

the first base rail and the second base rail are mechanically coupled to a top rail pipe by a base pipe;

a socket pipe, attached to and housed within the top rail pipe through the removable chocking member cavity; wherein the uppermost portion of the socket pipe is joined with the top rail pipe in order to segregate air in the socket pipe from the top rail pipe; and the top rail pipe has a greater diameter than the first base rail and the second base rail which enables the improved pipe rack assembly to support up to 500,000 pounds of pipes.

2. The improved pipe rack assembly of claim 1, end caps, placed on the first base rail, the second base rail, the horizontal base pipe and the base pipe; wherein pressurized air fills the first base rail, the second base rail, the horizontal base pipe and the base pipe without leaking in order to establish structural integrity.

3. The improved pipe rack assembly of claim 1, the first base rail, the second base rail, the horizontal base pipe and the base pipe are cut and welded together such that they can be capped and air tested to further ensure safety.

* * * * *